United States Patent
Lee et al.

(10) Patent No.: US 11,875,490 B2
(45) Date of Patent: Jan. 16, 2024

(54) METHOD AND APPARATUS FOR STITCHING IMAGES

(71) Applicant: Foundation for Research and Business, Seoul National University of Science and Technology, Seoul (KR)

(72) Inventors: Yeejin Lee, Seoul (KR); Byeongkeun Kang, Seoul (KR); Seongyeop Yang, Seoul (KR); Taeha Kim, Hwaseong-si (KR)

(73) Assignee: Foundation for Research and Business, Seoul National University of Science and Technology, Seoul (KR)

( * ) Notice: Subject to any disclaimer, the term of this patent is extended or adjusted under 35 U.S.C. 154(b) by 169 days.

(21) Appl. No.: 17/558,969

(22) Filed: Dec. 22, 2021

(65) Prior Publication Data

US 2022/0207679 A1   Jun. 30, 2022

(30) Foreign Application Priority Data

Dec. 29, 2020   (KR) .......................... 10-2020-0186308

(51) Int. Cl.
 *G06T 5/50* (2006.01)
 *G06T 7/30* (2017.01)
 *G06V 10/40* (2022.01)

(52) U.S. Cl.
 CPC .................. *G06T 5/50* (2013.01); *G06T 7/30* (2017.01); *G06V 10/40* (2022.01); *G06T 2207/20084* (2013.01); *G06T 2207/20221* (2013.01)

(58) Field of Classification Search
 CPC ... G06T 5/50; G06T 7/30; G06T 2207/20084; G06T 2207/20221; G06V 10/40; G06V 10/803; G06V 10/82; G06V 10/24
 See application file for complete search history.

(56) References Cited

U.S. PATENT DOCUMENTS

| | | | | |
|---|---|---|---|---|
| 2015/0070523 | A1* | 3/2015 | Chao | G06T 3/4038 348/218.1 |
| 2016/0063705 | A1* | 3/2016 | Xu | H04N 5/2624 382/199 |
| 2020/0020075 | A1* | 1/2020 | Khwaja | G06T 5/002 |
| 2020/0137317 | A1* | 4/2020 | Abbas | H04N 23/698 |

(Continued)

OTHER PUBLICATIONS

Song et al., "CarvingNet: Content-Guided Seam Carving Using Deep Convolution Neural Network", IEEE, 2019, vol. 7, pp. 284-292 (9 pages). (Year: 2019).*

(Continued)

*Primary Examiner* — Michael Le
(74) *Attorney, Agent, or Firm* — WHDA, LLP

(57) ABSTRACT

An image stitching method and apparatus are disclosed. The image stitching apparatus includes at least one processor and a memory. The processor may obtain a plurality of images at different viewpoints, estimate homographies of each of the plurality of images, generate an aligned image by aligning the plurality of images based on the homographies of each of the plurality of images, obtain a collective energy map by inputting the aligned image to a neural network, estimate a stitching line of the aligned image based on the collective energy map, and generate a stitched image by blending the aligned image based on the stitching line.

5 Claims, 8 Drawing Sheets

(56) References Cited

U.S. PATENT DOCUMENTS

2021/0142497 A1* 5/2021 Pugh .................. G06T 7/55

OTHER PUBLICATIONS

Hejazifar et al., "Fast and robust seam estimation to seamless image stitching", Signal, Image and Video Processing, 2018, vol. 12, pp. 885-893 (9 pages). (Year: 2018).*
Song et al., "CarvingNet: Content-Guided Seam Carving Using Deep Convolution Neural Network", EEE, 2019, vol. 7, pp. 284-292 (9pages). (Year: 2019).*
Song et al., "CarvingNet: Content-Guided Seam Carving Using Deep Convolution Neural Network", IEEE, 2019, vol. 7, pp. 284-292 (9 pages).
Hejazifar et al., "Fast and robust seam estimation to seamless image stitching", Signal, Image and Video Processing, 2018, vol. 12, pp. 885-893 (9 pages).
Kim et al., "Fast Content-preserving Seam Estimation for Real-time High-resolution Video Stitching", Journal of Broadcast Engineering, Nov. 2020, vol. 25, No. 6, pp. 1004-1012, http://www.dbpia.co.kr/journal/articleDetail?hodeld=NODE10501773, w/English abstract (10 pages).
Gwak et al., "Moving Object Preserving Seamline Estimation", Journal of Broadcast Engineering, Nov. 2019, vol. 24, No. 6, pp. 992-1001, http://www.dbpia.co.kr/journal/articleDetail?nodeld=NODE09277446, w/English abstract (11 pages).

* cited by examiner

METHOD AND APPARATUS FOR STITCHING IMAGES

CROSS-REFERENCE TO RELATED APPLICATION

This application claims the benefit of Korean Patent Application No. 10-2020-0186308 filed on Dec. 29, 2020, in the Korean intellectual Property Office, the entire disclosure of which is incorporated herein by reference for all purposes.

BACKGROUND

1. Field of the Invention

One or more example embodiments relate to a technology for image stitching, and more particularly, a technology for estimating an energy map using a neural network.

2. Description of the Related Art

In an image stitching process, a distortion may occur in an overlapping area of stitched images based on a difference in parallax of a scene, illuminance, and distance. When stitching is performed on a video including consecutive images, a parallax may be different for each area due to a movement of a scene, an appearance of an object, and the like such that a distortion may occur as the overlapping area including the object is overlapped, distorted, or cut out.

SUMMARY

According to an aspect, there is provided an image stitching method including obtaining a plurality of images at different viewpoints, estimating homographies of the plurality of images, generating an aligned image by aligning the plurality of images based on the homographies of each of the plurality of images, obtaining a collective energy map by inputting the aligned image to a neural network, estimating a stitching line of the aligned image based on the collective energy map, and generating a stitched image by blending the aligned image based on the stitching line.

The obtaining of the collective energy map may include extracting feature information from the aligned image, and calculating an energy for each pixel of the aligned image based on the feature information.

The neural network may estimate an estimated energy map from a training image of a different viewpoint and learn to minimize a loss between the estimated energy map and a ground truth energy map.

The estimated energy map and the ground truth energy map may include an energy map using a gradient of the training image of the different viewpoint, an energy map using a motion of an object between frames, or an energy map using object segmentation.

According to another aspect, there is provided an image stitching apparatus including at least one processor and a memory. The processor may obtain a plurality of images at different viewpoints, estimate homographies of the plurality of images, generate an aligned image by aligning the plurality of images based on the homographies of each of the plurality of images, obtain a collective energy map by inputting the aligned image to a neural network, estimate a stitching line of the alighted image based on the collective energy map, and generate a stitched image by blending the aligned image based on the stitching line.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
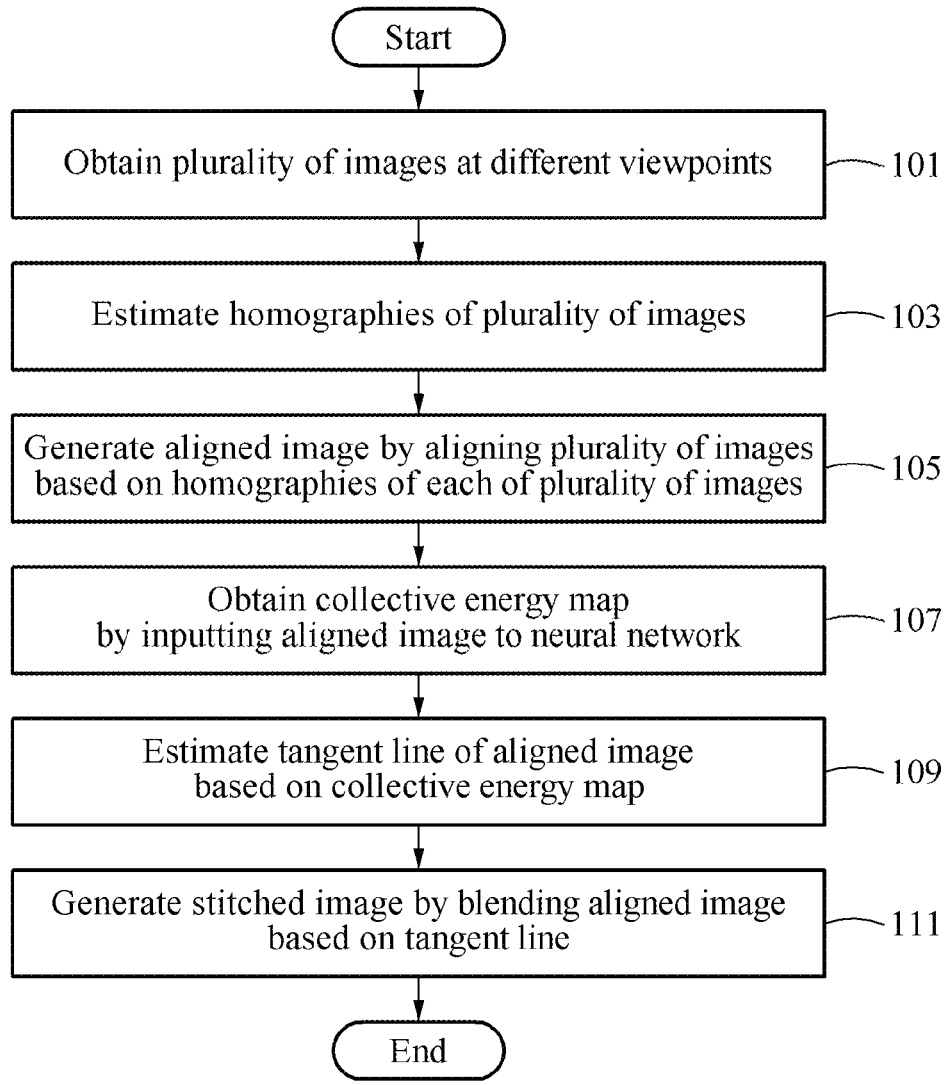
FIG. 1 is a diagram illustrating an example of an overall operation of an image stitching method according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with inference to the accompanying drawings. When describing the example embodiments with reference to the accompanying drawings, like reference numerals refer to like components and a repeated description related thereto will be omitted.

FIG. 1 illustrates an example of an overall operation of an image stitching method.

An image stitching apparatus described herein may estimate an energy map using a neural network trained in advance with respect to a plurality of input images for creating a 360-degree (°) image. The image stitching apparatus may estimate the energy map using an end-to-end neural network. The image stitching apparatus may estimate a stitching line (or seam line) using the estimated energy map and generate a stitched image.

An existing image stitching apparatus may estimate an energy map of an aligned image through a separate algorithm for image stitching to resolve a distortion issue in a stitching process. However, when a separate algorithm is used, maintaining a high level of accuracy for various types of energy maps may be extremely costly.

In contrast, the image stitching apparatus may greatly reduce the cost by estimating an energy map using a neural network. Instead of each algorithm being designed, the neural network may be trained in advance using a great amount of training data and achieve a higher accuracy at a lower cost.

Hardware for artificial intelligence (AI) implementation is being developed alongside with developments in AI technology. Thus, performance of deep learning-based algorithms has improved even more, and a high level of accuracy may be achieved. A reliable energy map may be estimated using a deep learning-based neural network, and when the energy map is used for image stitching, a distortion that occurs in a stitching process may be reduced.

As it is possible to obtain ultra-high-resolution images and facilitate 5G communication due to image sensor technology, demand for ultra-high-resolution and ultra-high-capacity data processing is increasing. Thus, the image stitching apparatus may be applied into a field in which high-quality and high-resolution virtual reality (VR) content are generated.

Hereinafter, each operation of the image stitching method performed by the image stitching apparatus is described in detail with reference to FIG. 1.

In operation 101, the image stitching apparatus may obtain a plurality of images at different viewpoints.

In operation 103, the image stitching apparatus may estimate homographies of the plurality of images.

In operation 105, the image stitching apparatus may generate an aligned image by aligning the plurality of images based on the homographies of each of the plurality of images.

In operation 107, the image stitching apparatus may obtain a collective energy map by inputting the aligned image to a neural network. The image stitching apparatus may extract feature information from the aligned image. The image stitching apparatus may calculate energy for each pixel of the aligned image based on the feature information.

Here, the neural network may be trained to estimate an estimated energy map from a training, image of different viewpoints and be trained to minimize a loss between the estimated energy map and a ground truth energy map.

The estimated energy map and the ground truth energy map may include an energy map rising a gradient of the training image of different viewpoints, an energy map using a motion of an object between frames, an energy map using object segmentation, or a map obtained by transforming object segmentation to a distance.

In operation 109, the image stitching apparatus may estimate a stitching line of the aligned image based on the collective energy map.

In operation 111, the image stitching apparatus may generate a stitched image by blending the aligned image based on the stitching line.

Instead of the image stitching apparatus separating and calculating elements (e.g., gradient, motion, etc.) included in an existing energy map and estimating a final energy map, the final energy map may be generated using an end-to-end neural network, and thus a stitching line may be estimated using a corresponding result.

When a result of AI-based object segmentation and object detection are used in the energy map, a higher quality stitching result may be obtained, and the image stitching apparatus may estimate a collective energy map with an existing energy map using a neural network. The image stitching device may use any combination of elements of an energy map as the final energy map and generate the final energy map as an output of an artificial neural network (ANN).

In comparison to the image stitching apparatus that individually calculates elements of various types of energy maps, the image stitching apparatus may estimate the energy map all at once, and thus reduce calculation time.

Figure 2:
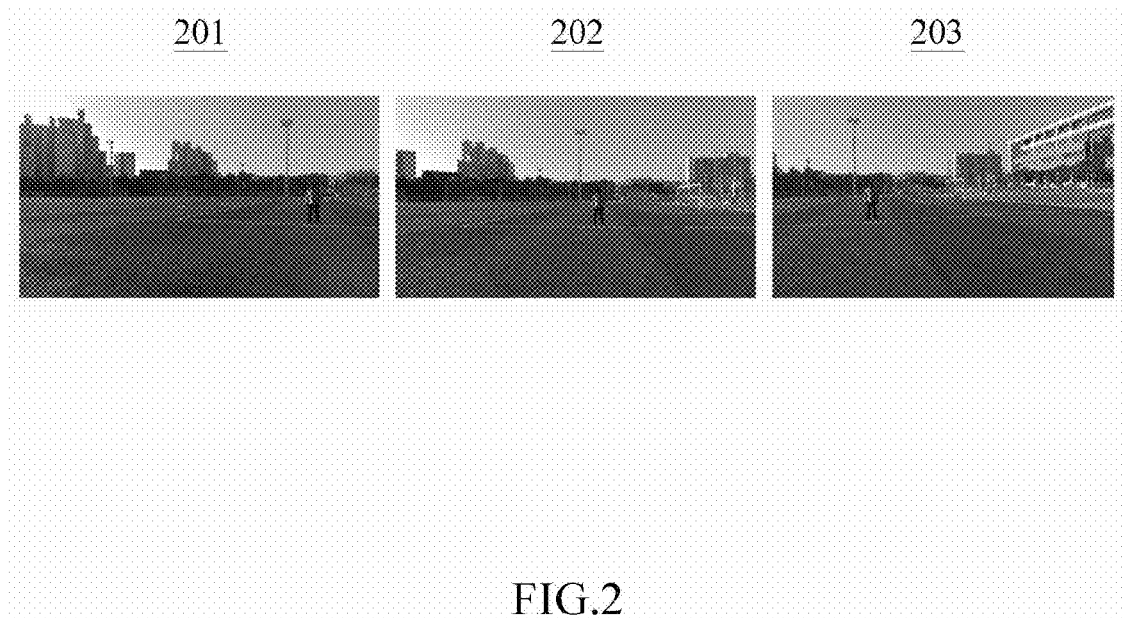
FIG. 2 is a diagram illustrating an example of a plurality of images of different viewpoints input to an image stitching apparatus according to an example embodiment.

FIG. 2 is a diagram illustrating an example of a plurality of images of different viewpoints input to an image stitching apparatus according to an example embodiment.

The image stitching apparatus may generate a stitched image by combining input images of different viewpoints. The input images of different viewpoints may be images captured by a 360° camera. The input images of different viewpoints may have overlapping areas. The cage stitching apparatus may align a plurality of input images based on the overlapped areas.

Referring to FIG. 2, the image stitching apparatus may receive a plurality of input images 201, 202, and 203. The image stitching apparatus may align the plurality of input images 201, 202, and 203 based on overlapping areas of the plurality of input images 201, 202, and 203. The image stitching apparatus may generate an aligned image.

Figure 3:
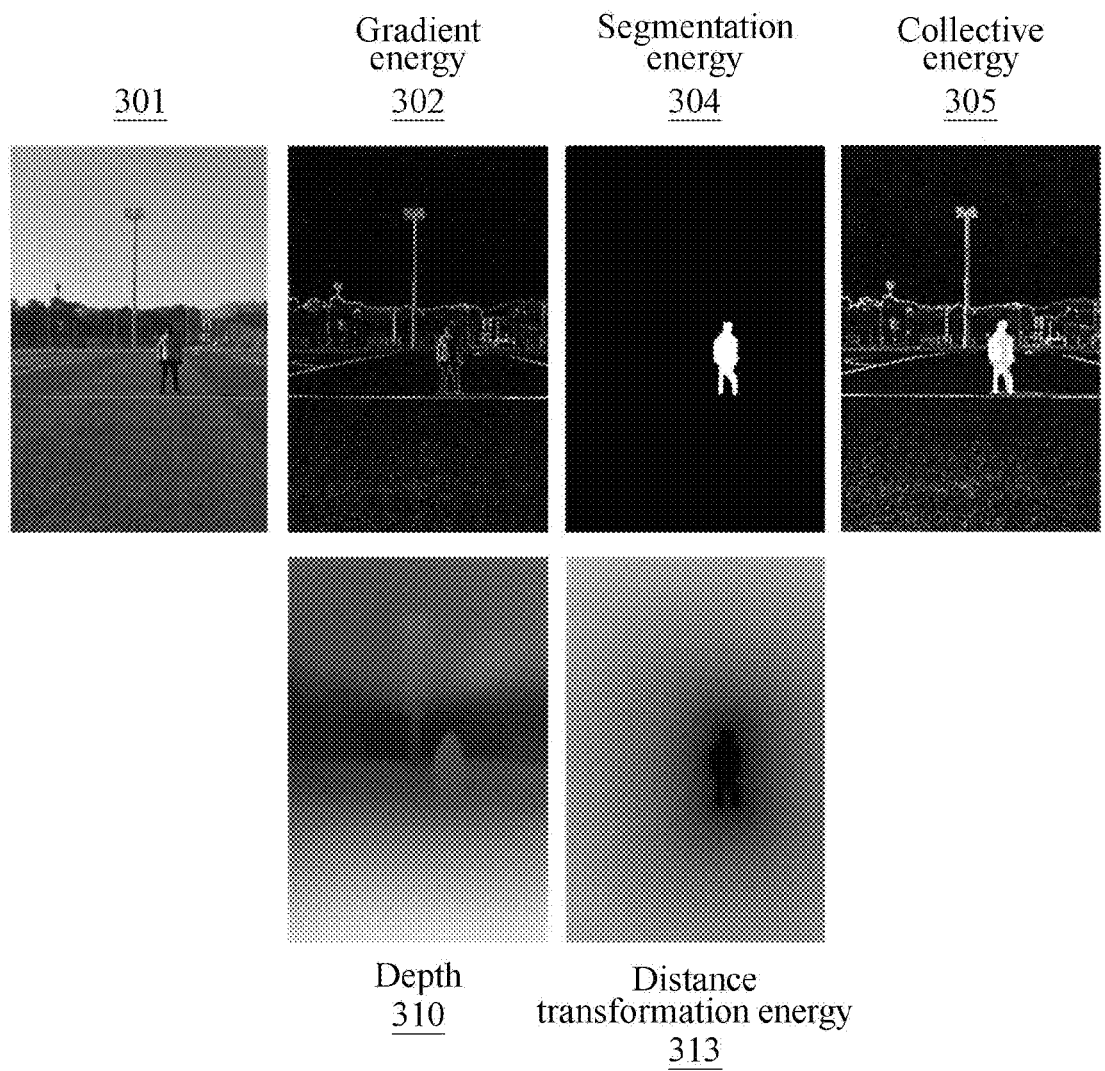
FIG. 3 is a diagram illustrating examples of various types of energy maps according to example embodiments.

FIG. 3 is a diagram illustrating examples of various types of energy maps according to example embodiments.

Referring to FIG. 3, a gradient energy map 302, a segmentation energy map 304, a depth map 310, and a distance transformation energy map 313 for an input image 301 are illustrated. A collective energy map 305 that combines such energy maps is also illustrated.

In addition, various types of energy maps or a collective energy map by a combination thereof may be used. For example, an energy map may be an energy map using a gradient, an energy map using a motion, an energy map using object segmentation, an energy map using distance transformation of object segmentation, an energy map using a saliency map, an energy eta map using the gradient and the motion, an energy map using the gradient and the object segmentation, an energy map using the gradient and the distance transformation of object segmentation, an energy map using the gradient, the motion, and the distance transformation of object segmentation, an energy map using the gradient and the saliency map, an energy map using the gradient and the distance transformation of object segmentation, an energy map using the gradient, the motion, and the object segmentation, an energy map using the gradient, the motion, and the distance transformation of object segmentation, an energy map using the gradient, the motion, and the saliency map, an energy map using the gradient, the motion, the object segmentation, and geometric features, an energy map using the gradient, the motion, the distance transformation of object segmentation, and the geometric features, and an energy map using the gradient, the motion, the saliency map, and the geometric features.

Figure 4:
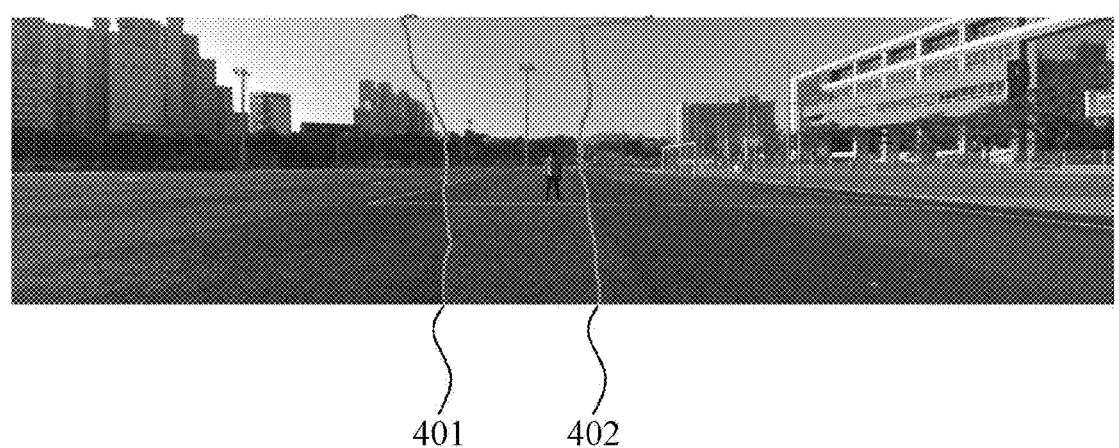
FIG. 4 is a diagram illustrating an example of a stitching line estimated by an image stitching method according to an example embodiment.

FIG. 4 is a diagram illustrating an example of a stitching line estimated by an image stitching method according to an example embodiment.

An image stitching apparatus may estimate stitching lines 401 and 402 of an aligned image based on a collective energy map. For example, when the image stitching apparatus estimates a stitching line using a gradient, a motion, and a segmentation energy, the image stitching apparatus may estimate a path having a minimum energy as the stitching line. In another example, when the stitching line is estimated using a distance transformation energy, the image stitching apparatus may estimate a path having a maximum energy as the stitching lime.

Figure 5:
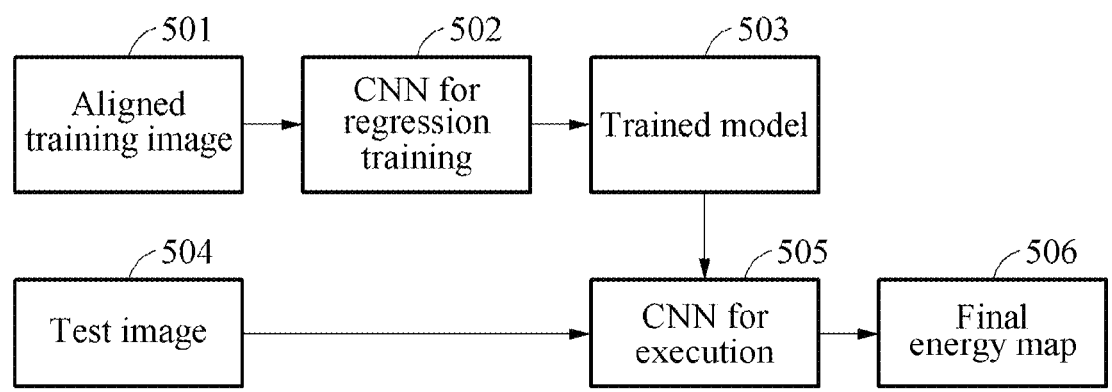
FIG. 5 is a diagram illustrating an example of a process of estimating a collective energy map based on a neural network according to an example embodiment.

FIG. 5 is a diagram illustrating an example of a process of estimating a collective energy map based on a neural network according to an example embodiment.

An image stitching apparatus may obtain the collective energy map by inputting an aligned image to a neural network. The image stitching apparatus may firstly obtain a trained model 503 by inputting an aligned training image 501 to a convolutional neural network (CNN) 502 for regression training.

The image stitching apparatus may obtain a final energy map 506 by inputting a test image 504 to a CNN 505 for execution. Here, the CNN 505 for execution may be the trained model 503.

Figure 6:
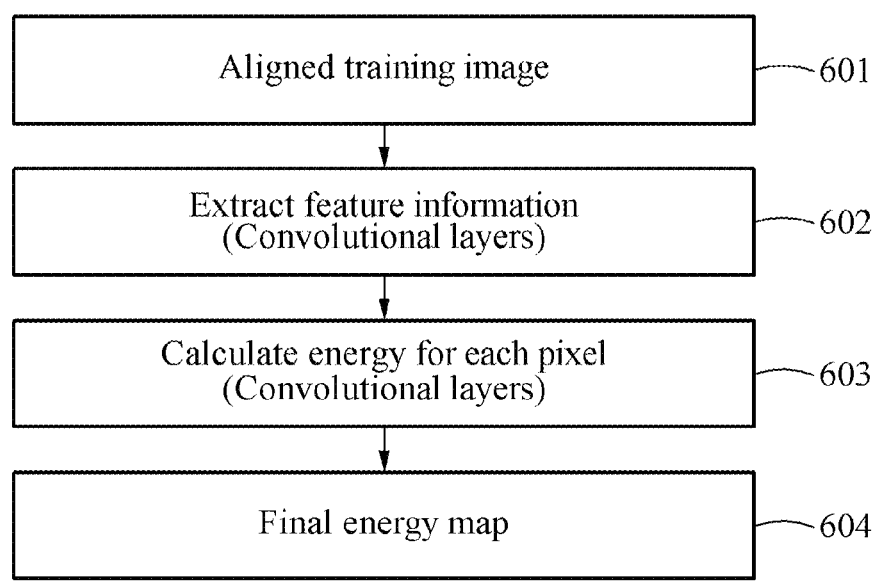
FIG. 6 is a diagram illustrating an example of a training process of a neural network according to an example embodiment.

FIG. 6 is a diagram illustrating an example of a training process of a neural network according to an example embodiment.

In operation 601, a training apparatus may generate an aligned training image by combining a plurality of training images. The training apparatus may align a plurality of input images based on overlapping areas.

In operation 602, the training apparatus may extract feature information from the aligned training image using a CNN (or convolutional layers).

In operation 603, the training apparatus may perform energy calculation for each pixel using the feature information with the CNN (or convolutional layers).

In operation 604, the training apparatus may generate a final energy map 604 based on a result of calculating energy for each pixel.

The training apparatus may train the neural network by comparing the final energy map 604 and a ground truth energy map. The training apparatus may calculate a loss value of the loss function for the final energy map 604 and the ground truth energy map and train the neural network based on the loss value. The training apparatus may train the neural network such that a difference between an estimated energy map and the ground truth energy map is minimized.

For example, the training apparatus may train the neural network using a loss function of Equation 1.

$$L = \frac{1}{m}\sum_{p=1}^{m} \text{Cost }(I(p), T(p)) + \frac{\lambda}{2m}\sum_{j=1}^{n} \theta_j^2 \quad \text{[Equation 1]}$$

In Equation 1, m denotes a number of pixels in an image, n denotes a number of parameters to be trained, θ denotes a parameter to be trained, I denotes an estimated energy map, T denotes an energy map to be trained, and p denotes a pixel in the image.

An objective function may be represented as $\text{Cost}(I(p),T(p))=(I(p)-T(p))^2$ or $\text{Cost}(I(p),T(p))=|I(p)-T(p)|$. An equation corresponding to regularization for preventing overfitting may be represented as $$\frac{\lambda}{2m}\sum_{j=1}^{n} \theta_j^2.$$

Figure 7:
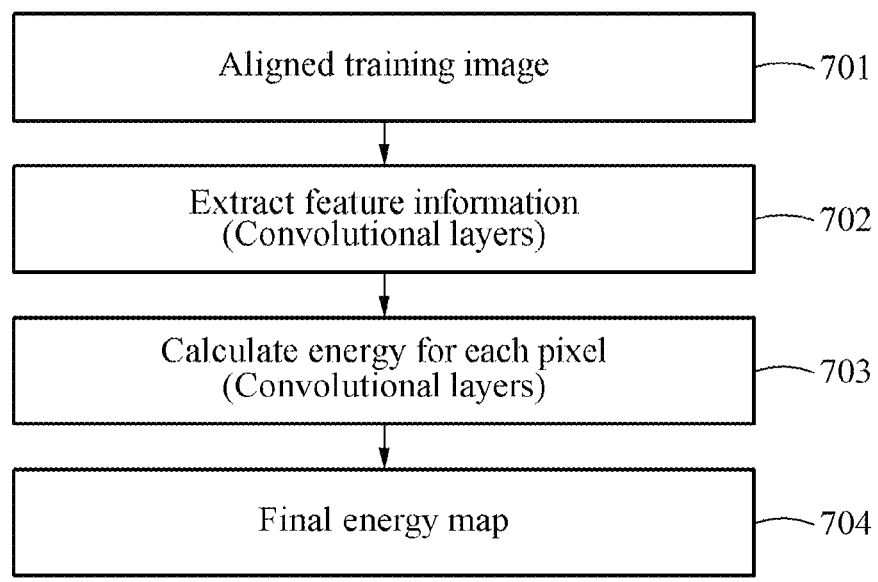
FIG. 7 is a diagram illustrating an example of a testing process of a neural network to according to an example embodiment.

FIG. 7 is as diagram illustrating an example of a testing process of a neutral network according to an example embodiment.

In operation 701, an image stitching apparatus may generate an aligned training image by aligning a plurality of training images. The image stitching apparatus may align the plurality of input images based on overlapped areas.

In operation 702, the image stitching apparatus may extract feature information from the aligned training image using a CNN (or convolutional layers).

In operation 703, the image stitching apparatus may perform energy calculation far each pixel using feature information with the CNN (or convolutional layers).

In operation 704, the image stitching apparatus may generate the final energy map 604 based on a result of calculating energy for each pixel.

The image stitching apparatus may estimate a stitching line of the aligned image based on the final energy map. The image stitching apparatus inlay generate a stitched image by blending an aligned image based on the stitching line.

Figure 8:
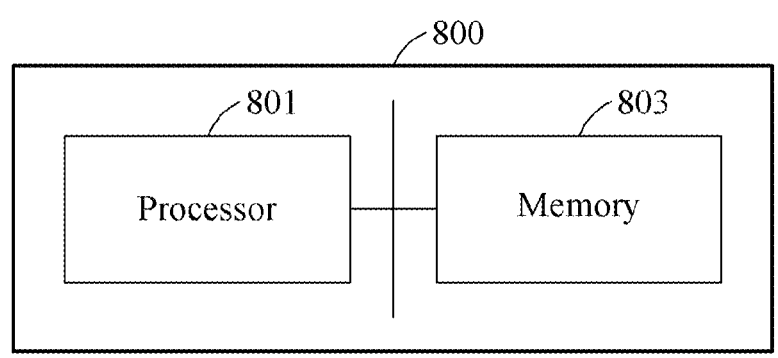
FIG. 8 is a diagram illustrating an example of a structure of an image stitching apparatus according to an example embodiment.

FIG. 8 is a diagram illustrating an example of a structure of an image stitching apparatus according to an example embodiment.

Referring to FIG. 8, the image stitching apparatus may include at least one processor 801 and a memory 803. The processor 801 may obtain a plurality of images at different viewpoints. The processor 801 may estimate homographies of the plurality of images. The processor 801 may generate an aligned image by aligning the plurality of images based on the homographies of each of the plurality of images. The processor 801 may obtain a collective energy map by inputting the aligned image to a neural network. The processor 801 may estimate a stitching line of the aligned image based on the collective energy map. The processor 801 may generate a stitched image by blending the aligned image based on the stitching line.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instinct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image stitching method, comprising:
    obtaining a plurality of images at different viewpoints;
    estimating homographies of the plurality of images;
    generating an aligned image by aligning the plurality of images based on the homographies of each of the plurality of images;
    obtaining a collective energy map by inputting the aligned image to a neural network;
    estimating a stitching line of the aligned image based on the collective energy map; and
    generating a stitched image by blending the aligned image based on the stitching line,
    wherein the collective energy map combines an energy map using a gradient, an energy map using a motion, an energy map using object segmentation, and an energy map using distance transformation of object segmentation, and
    wherein the image stitching method estimates the stitching line as a path having a minimum energy or a maximum energy.

2. The method of claim 1, wherein the obtaining of the collective energy map comprises:
    extracting feature information from the aligned image; and
    calculating an energy for each pixel of the aligned image based on the feature information.

3. The method of claim 1, wherein the neural network is configured to:
    estimate an estimated energy map from a training image of a different viewpoint and learn to minimize a loss between the estimated energy map and a ground truth energy map.

4. The method of claim 3, wherein the estimated energy map and the ground truth energy map comprises:
    the energy map using the gradient of the training image of the different viewpoint, the energy map using the motion of an object between frames, or the energy map using the object segmentation.

5. An image stitching apparatus, comprising:
    at least one processor; and
    a memory,
    wherein the processor is configured to:
        obtain a plurality of images at different viewpoints;
        estimate homographies of the plurality of images;
        generate an aligned image by aligning the plurality of images based on the homographies of each of the plurality of images;
        obtain a collective energy map by inputting the aligned image to a neural network;
        estimate a stitching line of the aligned image based on the collective energy map; and
    generate a stitched image by blending the aligned image based on the stitching line,
    wherein the collective energy map combines an energy map using a gradient, an energy map using a motion, an energy map using object segmentation, and an energy map using distance transformation of object segmentation, and
    wherein the image stitching apparatus estimates the stitching line as a path having a minimum energy or a maximum energy.

* * * * *